C. G. THOMPSON.
SIFTER.
APPLICATION FILED APR. 22, 1921.
1,407,601.
Patented Feb. 21, 1922.
3 SHEETS—SHEET 1.
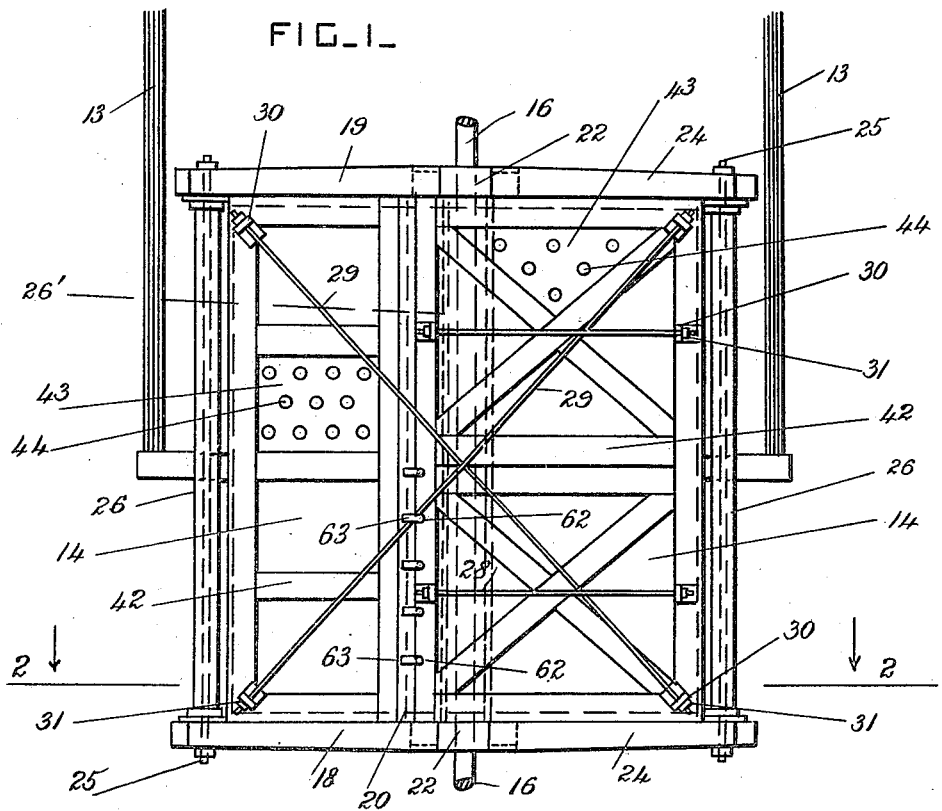
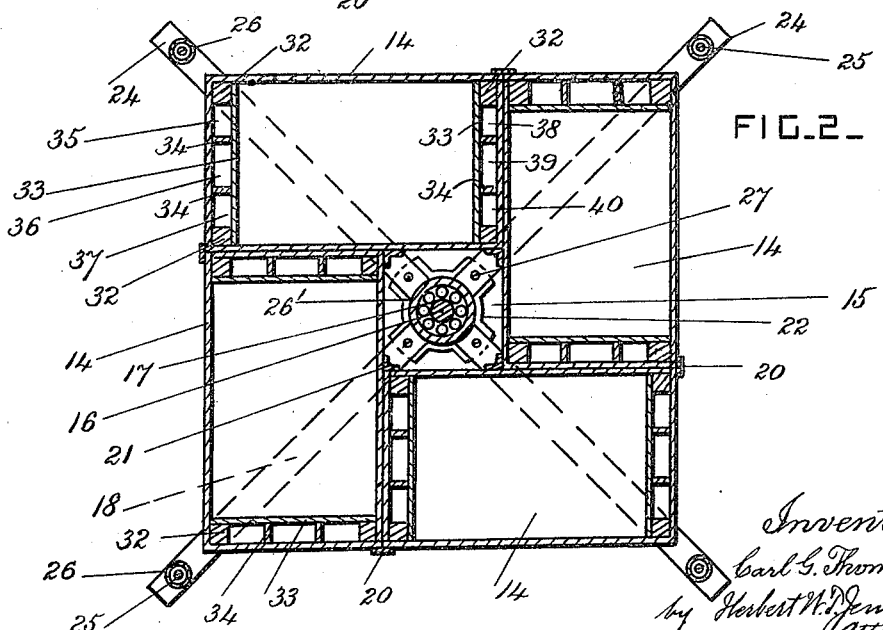
Inventor.
Carl G. Thompson,
by Herbert W. Jenner,
Attorney.

C. G. THOMPSON.
SIFTER.
APPLICATION FILED APR. 22, 1921.
1,407,601.
Patented Feb. 21, 1922.
3 SHEETS—SHEET 2.
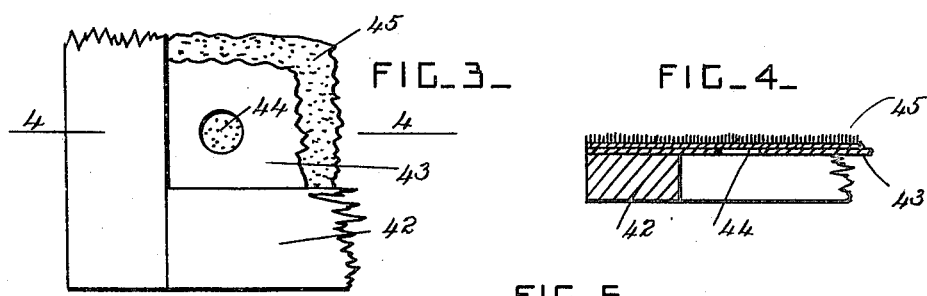
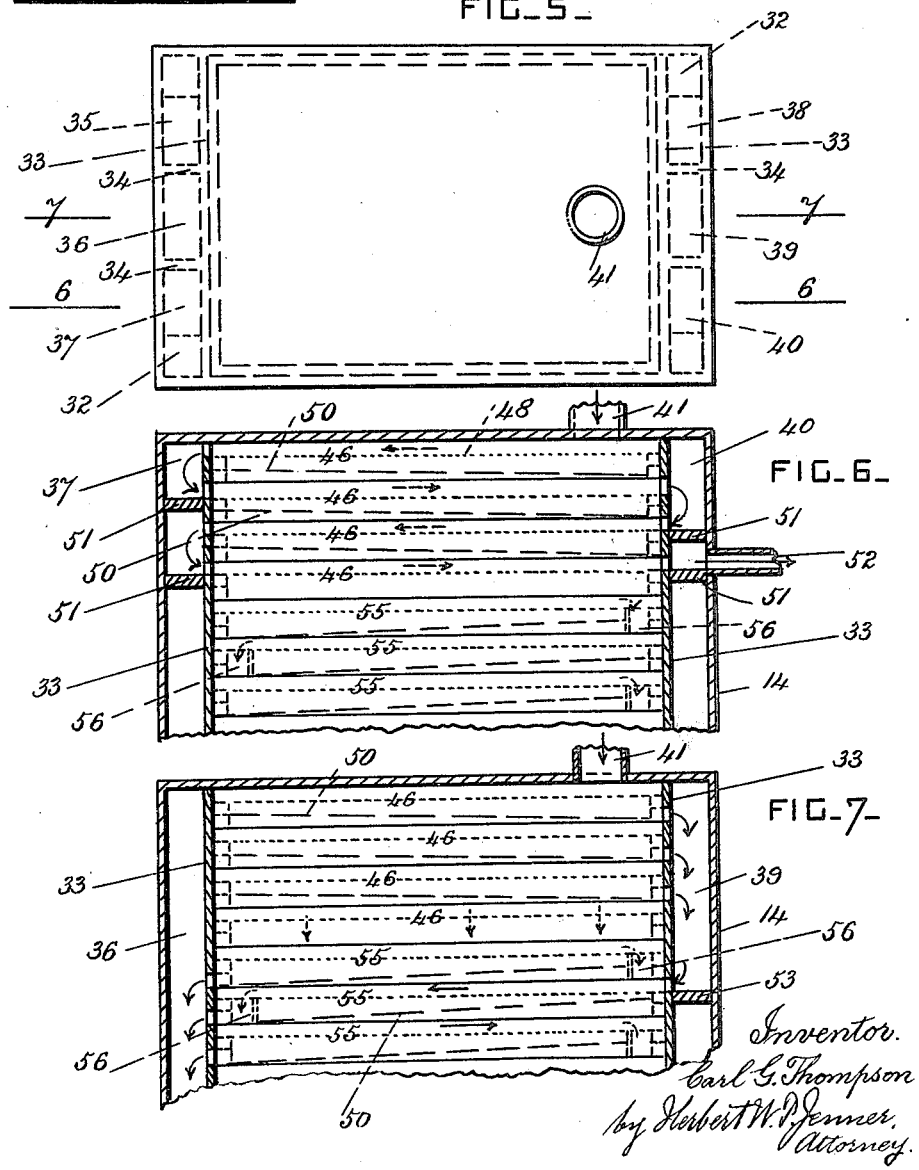

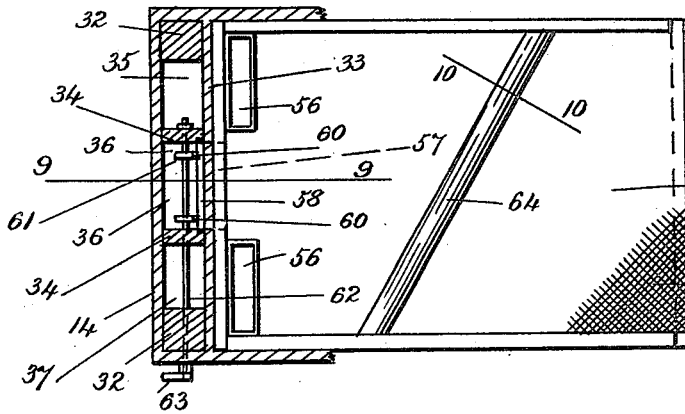
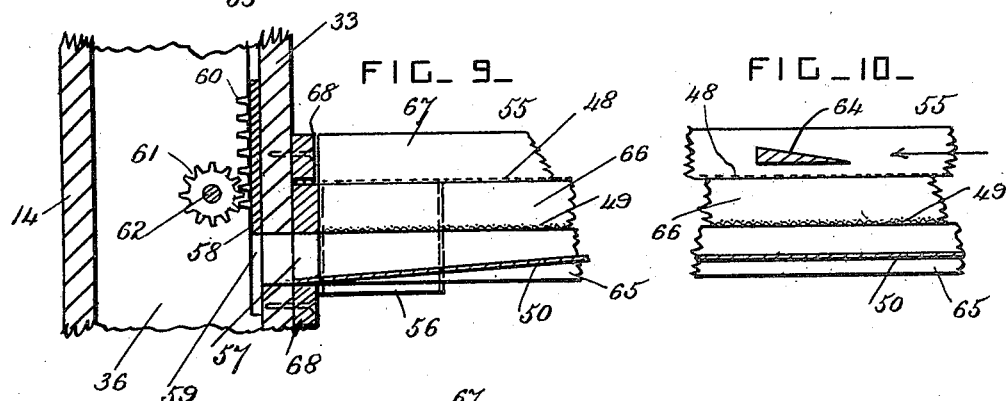
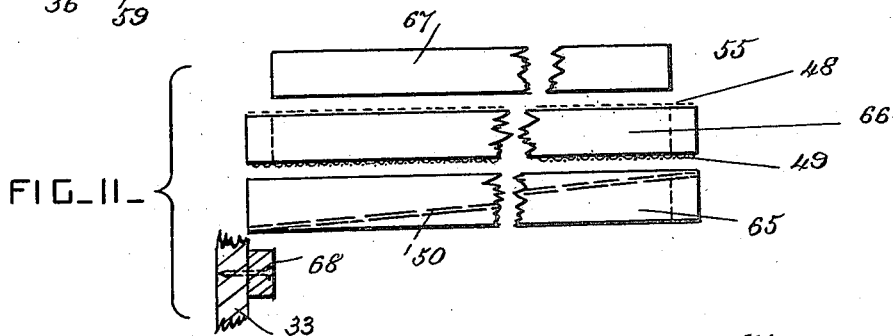
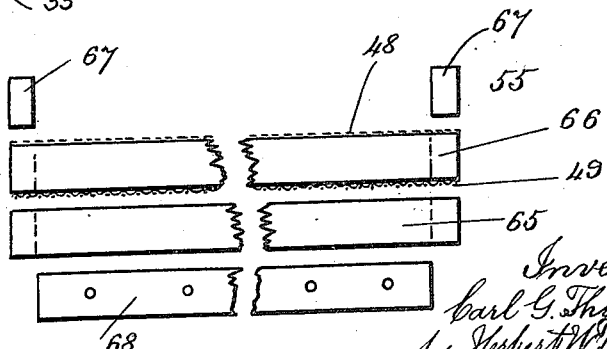

UNITED STATES PATENT OFFICE.

CARL G. THOMPSON, OF KNOXVILLE, TENNESSEE.

SIFTER.

1,407,601.                Specification of Letters Patent.    Patented Feb. 21, 1922.

Application filed April 22, 1921. Serial No. 463,709.

*To all whom it may concern:*

Be it known that I, CARL G. THOMPSON, a citizen of the United States, residing at Knoxville, in the county of Knox and State of Tennessee, have invented certain new and useful Improvements in Sifters, of which the following a specification.

This invention relates to chop graders of the kind known as sifters or shaking bolts which are gyrated in a horizontal plane. This invention consists chiefly in the construction of the sifter casing, the arrangement and construction of its passages and sieves, and in various details as hereinafter fully described and claimed.

In the drawings, Figure 1 is a side view of a sifter constructed according to this invention. Fig. 2 is a plan view, taken in section on the line 2—2 in Fig. 1, the sieves and various other parts being omitted, for clearness. Fig. 3 is a detail side view of a portion of the sifter casing, drawn to a larger scale. Fig. 4 is a section through the same, taken on the line 4—4 of Fig. 3. Fig. 5 is a plan view of one of the sifter boxes. Fig. 6 is a vertical section through the upper part of the sifter box, taken on the line 6—6 in Fig. 5, and showing a side view of the sieves. Fig. 7 is a vertical section similar to Fig. 6, but taken on the line 7—7 in Fig. 5. Fig. 8 is a plan view of one of the sieves, showing a portion of the sifter box in section, and one of the cutoffs. Fig. 9 is a vertical section, taken on the line 9—9 of Fig. 8, drawn to a larger scale, and showing the cut-off and a portion of the sieve. Fig. 10 is a cross-section, taken on the line 10—10 in Fig. 8, and showing one of the dividers or flights. Fig. 11 is a side view of a sieve showing its parts detached. Fig. 12 is an end view of the parts shown in Fig. 11.

The sifter casing is formed of a plurality of sifter boxes 14. Four boxes 14 are preferably provided, and they are arranged around a central space 15, as shown in Fig. 2. These four boxes are all substantially alike, and each one works independently of the others, and contains a series of superposed sieves which will be more fully described hereinafter. Each box has four sides, a top, and a bottom, and can be removed and replaced in the machine independently of the others. This sifter casing is suspended from any suitable support by flexible connections 13, and gyratory motion is imparted to it, in a horizontal plane, by any approved driving mechanism. The driving shaft 16 of this mechanism is preferably journaled in ball bearings 17 in the upper and lower parts of the casing, and is arranged vertically in the central space 15.

In order that the sifter boxes 14 may be constructed in a novel manner, and the whole casing be very light and strong, the boxes are arranged between a bottom frame 18 and a top frame 19. The boxes are secured together by flat bars 20 of thin metal secured over their meeting edges outside the casing, and by angle-shaped bars 21 secured over their adjacent parts in the corners of the central space 15.

Each frame 18 and 19 is formed of a central socket 22, which contains the ball bearing, and radial arms 24 secured to the socket and projecting beyond the angles of the casing. These arms are secured to the socket, and the upper and lower arms are secured together at their outer end portions by vertical clamping bolts 25 which pass through tubular distance-pieces 26 arranged between the arms, and by similar bolts 27 arranged in the central space 15.

A tubular distance piece 26' is also arranged between the sockets 22, around the driving shaft.

The sides of the boxes 14 are provided with horizontal brace rods 28, and the sides and ends of the boxes are provided with diagonal cross brace rods 29. These brace rods are secured to brackets 30 on the boxes, and have nuts 31 or other suitable means for tightening them and holding them under tension.

Each sifter box 14 has uprights 32 at its corners, and vertical partitions 33 near its ends. Cross partitions 34 are arranged vertically between the partitions 33 and the ends of the boxes, and form with them a plurality of passages. Three vertical passages 35, 36, and 37, are shown at one end of each box, and three passages 38, 39, and 40, at its other end. The number of these passages may however be varied in carrying out this invention. The stock is fed into each sifter box at its top through an inlet 41, as shown in Figs. 5, 6 and 7, and the middle passages 36 and 39 preferably form the outlets for the flour at the bottom of the box.

Wheat usually contains moisture, and in recent years the general practise has been to add water to the wheat to increase its natural moisture. This moisture is not wholly removed from the stock as it comes from the roller mill, and it frequently causes the meshes of the sieve cloths to become pasted up in sifters as ordinarily constructed.

In order to overcome this difficulty, the sifter boxes 14 are formed of wooden skeleton frames 42 secured to the aforesaid uprights 32, and thin sheets 43 of perforated sheet metal are secured over these frames to form the sides and ends of the boxes.

The holes 44 in these sheets form air passages, and the boxes are provided with liners 45 of absorbent textile material, as shown in Figs. 3 and 4. This textile material is preferably a pile fabric, such as carpet, but other similar material may be used which will absorb moisture quickly, and permit its outward passage from the box. The carpet is secured with its back against the metal sheets or side plates, and it permits the moisture inside the sifter to be evaporated through the holes 44.

The sieves which are stacked one above another in each sifter box 14, are similar in many respects, and vary chiefly in fineness of mesh. Three or four different grades of sifter cloth are generally used. In Figs. 6 and 7 the four upper sieves 46 are relatively coarse in mesh, and are known as scalpers. Under them are finer sieves 55, known as graders, and below the graders come the second graders, and finally the dusters. The sieve cloth 48 of each sieve is wire cloth, silk, or other approved material. The sieve cloth 48 has a sheet 49 of wire-work arranged horizontally beneath it to support the cloth cleaners, and the material which passes through the cloth and the part 49 falls on an inclined bottom or gatherboard 50 so that it is discharged through an opening at one end of the sieve.

The scalper sieves 46 discharge the coarse matter which slides off them into the end passages 35, 37, and 38, 40, and these passages have horizontal cross plates 51, so that the coarse matter which passes over the cloth of each sieve is discharged through an outlet 52 at one side of the box, as shown in Fig. 6.

The material which passes through the cloth of each of the sieves 46 slides down the inclined bottom plates 50 into the middle passage 39, as shown in Fig. 7, onto a horizontal cross plate 53 which delivers it to a finer sieve 55. The lowest scalper sieve 46 has no bottom plate, and the material which passes through its cloth falls vertically onto the finer cloth of the top sieve 55. As many sieves 55 as desirable are provided. The material which does not pass through the cloth of each sieve 55 passes through vertical chutes or thimbles 56 at its end portion onto the cloth of the sieve next below it in the series. The chutes or thimbles 56 are arranged alternately at opposite ends of the sieves, so that the material follows a zigzag course, as indicated by the arrows in Figs. 6 and 7. The material which passes through the cloth of each sieve 55 falls on its inclined bottom plate 50 and passes into the middle passage 36, as shown in Fig. 7.

The sieves in the lower part of the sifter box are similar to the sieves 55 but have finer sieve cloth. The material is distributed to them in a similar manner, and the various grades of flour are discharged at the lowest part of the sifter box from its vertical end passages. The horizontal cross plates of these vertical end passages are arranged at various points according to the number and variety of the sieves provided in each sifter box.

When the cloth of a sieve becomes defective, that sieve can be put out of action by means of a cut-out, as shown in Figs. 8 and 9. Each sieve 55 has an outlet opening 57 which leads into the middle passage 36. A cut-out slide 58 is arranged to close this opening 57, and slides in any suitable guides such as grooves 59.

Toothed racks 60 are formed on the slides 58, and 61 are toothed pinions which gear into the racks 60. The pinions are secured on shafts 62 which project from the sifter box, and have handles 63 on their outer ends, as shown in Figs. 1 and 8. The slide is raised and lowered by turning its handle and shaft, and when the outlet opening 57 is closed, the sieve fills up with material to the level of its sieve cloth, and the descending material passes over its cloth and down its chutes or thimbles 56 to the next sieve below it in the series. Any or all of the sieves can be provided with these cut-outs as found desirable, and the cut-outs can be constructed and operated in various other ways in carrying out this invention.

In order to increase the efficiency of the sieves, a divider blade or flight 64 is secured substantially parallel to and a little above the sieve cloth. As many as desirable of the sieves can have one or more of these divider blades. The blade is preferably triangular in cross-section, as shown in Fig. 10, and it is arranged with its apex or sharp edge fronting the stock in the direction of its travel, which is indicated by the arrow. The finer material quickly forms a layer on the cloth, and passes under the divider blade. The upper stock which is not so fine passes up the inclined top of the blade, and falls over its rear side or blunt edge, and is thereby agitated or turned over, so that finer particles are not carried along by it. The blade 64 also operates as an impeller, and its blunt edge forces the coarse material to travel faster than the fine material next to the cloth.

Each sieve 55 is preferably made in three horizontal sections. The two lower sections are rectangular frames, as shown in Figs. 8, 11 and 12. The bottom section 65 carries the bottom plate 50. The middle section 66 carries the sieve cloth 48 and the cloth cleaner support 49. The upper section 67 is formed of two side bars, the end bars being omitted. Two bars 68 are secured to the sifter box, at the ends of the side bars 67. The bottom section 65 rests on the bars 68 which come below it, and the upper and middle sections 67 and 66 are secured together, and are slid into position on top of the bottom section 65. As many of the sieves as desired, or all of them, can be constructed in this way, each sieve being supported by a pair of bars 68, and this method of manufacture is found to facilitate the construction and repair of the sieves very materially.

What I claim is:

1. A sifter, comprising a plurality of oblong sifter boxes arranged end to side and forming a central opening, each box being separately removable and having four sides, a top and a bottom, and having sieves inclosed in it, frames arranged above the tops and below the bottoms of the said boxes, and means for clamping the boxes between the said frames.

2. A sifter, comprising a plurality of oblong sifter boxes arranged end to side and forming a central opening, each box being separately removable and having four sides, a top and a bottom, and having sieves inclosed in it, frames arranged above the tops and below the bottoms of the said boxes, fastening plates secured over the vertical joints between the said boxes, and means for clamping the boxes between the said frames.

3. A sifter, comprising a plurality of oblong sifter boxes arranged end to side and forming a central opening, each box being separately removable and having four sides, a top and a bottom, and having sieves inclosed in it, frames arranged above the tops and below the bottoms of the said boxes and having radial arms which project at the corners of the sifter, and clamping bolts arranged between the projecting end portions of the said arms.

4. A sifter, comprising a plurality of oblong sifter boxes arranged end to side and forming a central opening, each box being separately removable and having four sides, a top and a bottom, and having sieves inclosed in it, frames arranged above the tops and below the bottoms of the said boxes, brace rods secured to the exposed sides of the sifter boxes and connecting them together in pairs, and means for clamping the boxes between the said frames.

5. A sifter box, comprising a skeleton frame, side plates provided with air openings and secured inside the frame, a liner of moisture absorbing material secured over the air openings of the side plates, and sieves arranged in the sifter box.

6. A sifter box, comprising a skeleton frame, side plates of perforated sheet metal secured inside the frame, a liner of moisture absorbing material secured over the perforated side plates, and sieves arranged in the sifter box.

7. A sifter box, comprising a skeleton frame, side plates secured in the frame and provided with air openings, a liner of moisture absorbing pile fabric secured over the said air openings, and sieves arranged in the sifter box.

8. A sifter box lined with absorbent material and provided with outlet openings in its sides for the evaporation of the moisture gathered by the said absorbent material, and sieves arranged in the sifter box.

9. A sifter box having a side plate of rigid solid material provided with a multiplicity of perforations for the escape of moisture, moisture absorbing material secured over the perforations and preventing the outward passage of solid matter through them, and sieves arranged one above another in the sifter box with the air spaces between them communicating directly with the said absorbent material and perforations.

10. A sifter box provided with main vertical partitions near its ends which form passages, vertical cross partitions which divide the said passages into smaller passages, horizontal plates secured at predetermined points in certain of the smaller passages, a series of scalper sieves arranged one above another in the main portion of the sifter box, a series of inclined gatherboards alternating with the said sieves, the main partition at one end of the box having two openings between each two horizontal plates so that the unsifted material may pass by way of certain of the smaller passages from the upper side of each sieve to the upper side of the sieve next below it in the series, and the main partition at the other end of the box having an opening at the lower end of each gatherboard so that the sifted material which slides down it may pass into another of the said smaller passages.

11. A sifter box provided with a vertical partition at one end portion which forms an outlet passage for sifted material, a series of grader sieves arranged one above another in the sifter box, a series of inclined gatherboards alternating with the said sieves, the said partition having an opening at the lower end of each gatherboard so that the sifted material which slides down it may pass into the said outlet passage, and vertical chutes which form passages through the sieves and the gatherboards beneath them and conduct the unsifted material directly from each sieve to the sieve next below it in the series.

12. A sifter box provided with a vertical partition at one end portion which forms an outlet passage for sifted material, a series of grader sieves arranged one above another in the sifter box, a series of inclined gatherboards alternating with the said sieves, the said partition having an opening at the lower end of each gatherboard so that the sifted material which slides down it may pass into the said outlet passage, and vertical chutes arranged alternately at the opposite end portions of the sieves and forming passages through them and the gatherboards beneath them, said passages operating to conduct the unsifted material directly from each sieve to the sieve next below it in the series.

13. A sifter box provided with a vertical partition at one end portion which forms an outlet passage for sifted material, sieves arranged one above another in the sifter box, gatherboards alternating with the said sieves, the said partition having an opening at one end of each gatherboard so that the sifted material may normally pass from it into the said outlet passage, chutes which form passages through the sieves and the gatherboards next beneath them and which conduct the unsifted material directly from each sieves to the sieve next below it, and means for closing each opening for sifted material at will, so that the space below the sieve to which the closed opening pertains may fill up with material and the sieve thus cut out of action may operate as a conveyer bottom.

14. A sifter box provided with a vertical outlet passage, sieves arranged one above another in the sifter box and having outlets for sifted material which communicate with the said passage, a separate cut-off slide arranged in the said outlet passage and adapted to close the outlet of the sieve to which it pertains at will, a toothed rack secured to the back of the said slide, a toothed pinion gearing into the said rack and arranged in the said outlet passage, and a shaft for revolving the said pinion having an end portion which projects through the wall of the said outlet passage, each slide being operative independently of the others to cut out the sieve to which it pertains, and means for conducting the unsifted material from each sieve thus cut out to the sieve next below it which is not cut out.

15. A shaking sieve formed in three horizontal sections, the lower section comprising two side bars, one end bar and an inclined bottom plate, the middle section comprising two side bars, two end bars and a sifter cloth, and the upper section comprising two side bars which are secured to the side bars of the middle section.

16. A sifter box having two horizontal bars secured to it and arranged one at each end of it, a sieve formed of three horizontal sections, the lower section comprising two side bars, one end bar on an inclined bottom plate and being supported in the box on the said bars, the middle section comprising two side bars, two end bars and a sieve cloth, and being slidable on the lower section, and the upper section comprising two side bars which are secured to the side bars of the middle section.

In testimony whereof I have affixed my signature.

CARL G. THOMPSON.